Dec. 13, 1938.　　　　D. WILLIAMS　　　　2,140,439
AUTOMATIC DRIER
Filed March 2, 1936　　　2 Sheets-Sheet 1

INVENTOR:
DOW WILLIAMS.
BY Victor J Evans & Co
ATTORNEYS

Dec. 13, 1938.  D. WILLIAMS  2,140,439
AUTOMATIC DRIER
Filed March 2, 1936  2 Sheets-Sheet 2

INVENTOR:
DOW WILLIAMS.
BY Victor J Evans & Co
ATTORNEYS.

Patented Dec. 13, 1938

2,140,439

UNITED STATES PATENT OFFICE 2,140,439

AUTOMATIC DRIER

Dow Williams, Santa Ana, Calif.

Application March 2, 1936, Serial No. 66,704

1 Claim. (Cl. 15—99)

This invention relates to improvements in devices for drying surfaces, such as athletic fields, race tracks, walks, floors, or any other surface wherein moisture is to be removed therefrom.

A further object is to produce a device of this character which is readily portable, and one which may be moved over the surface without injury thereto.

A further object is to produce a device which is economical to manufacture.

A still further object is to produce a device which may be used by an unskilled person, and may be manually operated or power operated.

Other objects and advantages will be apparent during the course of the following description.

In the accompanying drawings forming a part of this specification and in which like numerals are employed to designate like parts throughout the same, Fig. 1 is a side elevation of my device;

Figure 1:
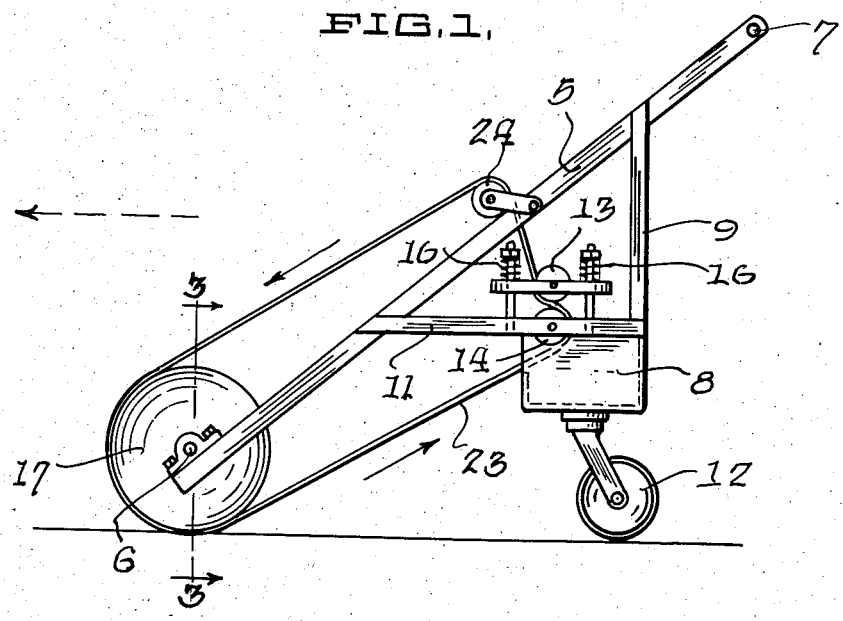

It is the object of the invention to produce a device for taking up the moisture from a surface, particularly a large surface, and one wherein it is not convenient to sweep the water from the surface; and, therefore, by providing a rotatable blotting like arrangement, the device will absorb the water and deposit it in a suitable receptacle.

In the accompanying drawings wherein for the purpose of illustration is shown a preferred embodiment of my invention, the numeral 5 designates a framework carrying a shaft 6 at its lower end and having a handle 7 at its upper end. The handle furnishes manual means whereby the entire arrangement may be moved but it is obvious that motive power may be applied in any convenient manner.

A receptacle is shown at 8, which receptacle is adapted to receive water, as will be later described. This receptacle is attached to the frame 5 by braces 9 and 11.

A caster or wheel is shown at 12, the purpose of which is obvious. Mounted above the receptacle 8 are rollers 13 and 14, the roller 13 being urged against the roller 14 through the medium of springs 16. The rollers 13 and 14 virtually form a wringer. Mounted upon the shaft 6 are a plurality of drums 17, each of which has a hollow hub 18, provided with a bore 19 of greater diameter than the diameter of the shaft 6. A pin 21 extends through the shaft 6 and has its ends projecting through openings formed in the hubs 18, which openings 22 are of greater diameter than the diameter of the pin 21.

The result of this drum and shaft connection is that as the drums are rolled over a surface, they will revolve; but may move up and down upon the shaft so as to absorb inequalities in the surface over which they are being rolled. A belt 23 of absorption material is passed over the drum 17, thence over the roller 14 and roller 13, thence over the idler 24, and back to the drum 17.

Figure 2:
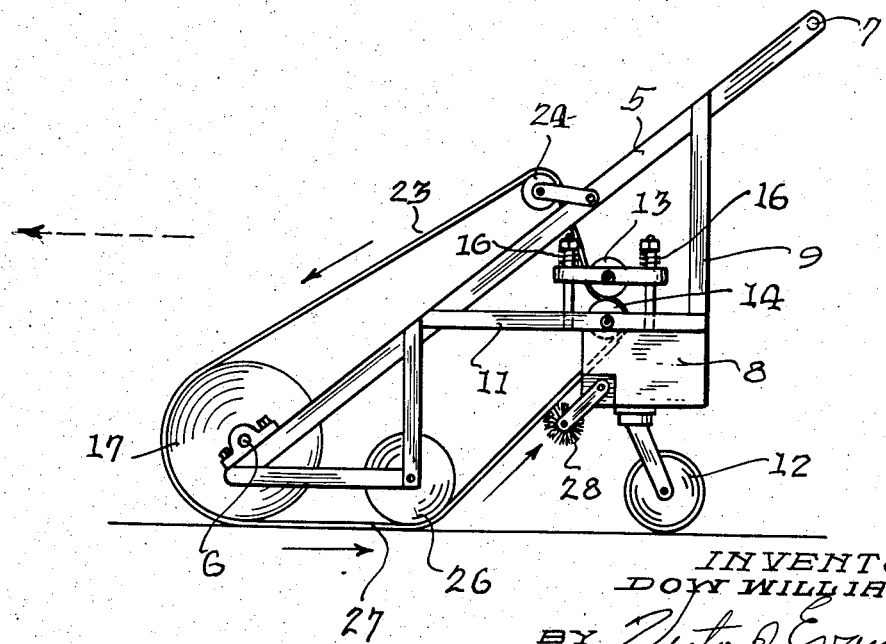
Fig. 2 is a side elevation showing a modified form of my device.
Figure 3:
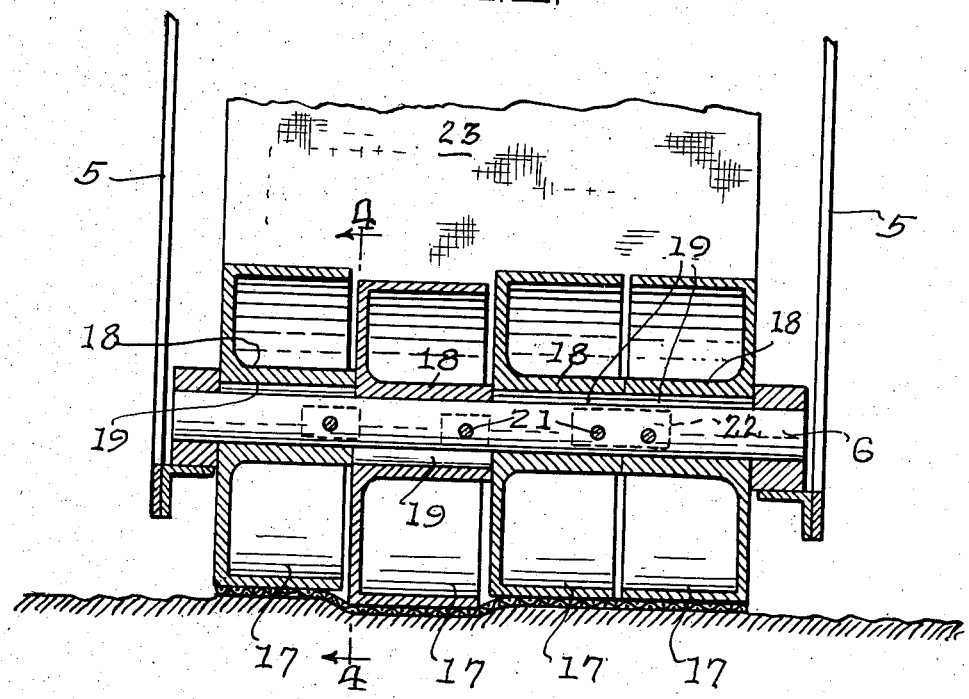
Fig. 3 is an enlarged cross sectional view taken on the line 3—3 of Fig. 1.
Figure 4:
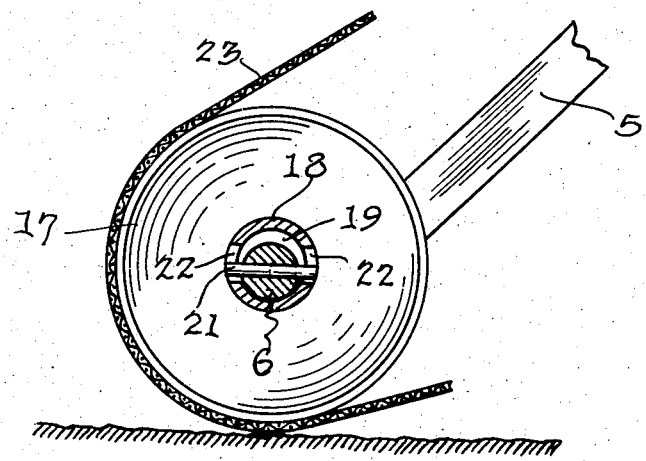
Fig. 4 is a cross sectional view taken on the line 4—4 of Fig. 3.

In the modified form shown in Fig. 2, I have provided a second set of idlers 26 so that a flat portion 27 contacts the ground. In this modified form, I have also shown a cleaning brush 28 which contacts the under surface of the belt and removes sticks, grass, and the like.

It will be apparent from the above description that when my device is moved over a surface which is wet that the belt in contacting the wet surface will act like a blotter in absorbing the moisture from the surface, and will carry the moisture between the rollers 13 and 14 where it will be squeezed out into the receptacle 8, from which the fluid may be dumped at any convenient point.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the class described including a frame having a shaft mounted therein, a plurality of drums loosely mounted on said shaft, each of said drums having a hub and a bore extending through said hub of greater diameter than the diameter of said shaft, slots formed in the hubs, pins extending through said shaft and into the slotted hubs, an endless belt of absorbent material carried by supporting means on said frame and passing partly around said drums and in contact therewith, whereby when said drums and said belt are moved over the ground, said drums will compensate for unevenness in the surface thereof.

DOW WILLIAMS.